United States Patent
Wurm et al.

(10) Patent No.: US 6,495,812 B1
(45) Date of Patent: Dec. 17, 2002

(54) APPARATUS AND METHOD FOR ANALYZING AN OBJECT OF INTEREST HAVING A PIVOTABLY MOVABLE SOURCE AND DETECTOR

(75) Inventors: John Henry Wurm, Lincoln, NE (US); Donald Thomas Lamb, Lincoln, NE (US)

(73) Assignee: Li-Cor, Inc., Lincoln, NE (US)

( * ) Notice: Subject to any disclaimer, the term of this patent is extended or adjusted under 35 U.S.C. 154(b) by 49 days.

(21) Appl. No.: 09/631,190

(22) Filed: Aug. 2, 2000

(51) Int. Cl.$^7$ .................................................. G01J 1/20
(52) U.S. Cl. ................... 250/201.1; 250/559.4; 250/461.2; 356/417; 204/461
(58) Field of Search ................. 250/559.4, 559.44, 250/559.22, 221, 216, 239, 458.1, 459.1, 461.2, 201.1; 340/555, 557; 356/239.1, 239.2, 239.3, 239.7, 239.8, 317, 318, 417, 344, 446; 204/461, 612

(56) References Cited

U.S. PATENT DOCUMENTS

| | | | |
|---|---|---|---|
| 4,053,780 A | 10/1977 | Sparks | 250/445 T |
| 4,706,772 A | * 11/1987 | Dawson et al. | 180/167 |
| 4,729,947 A | 3/1988 | Middendorf et al. | 435/6 |
| 4,734,578 A | 3/1988 | Horikawa | 250/234 |
| 5,069,769 A | 12/1991 | Fujimiya et al. | 204/182.8 |
| 5,100,529 A | 3/1992 | Fujii | 204/299 R |
| 5,207,880 A | 5/1993 | Middendorf et al. | 204/182.8 |
| 5,230,781 A | 7/1993 | Middendorf et al. | 204/182.8 |
| 5,346,603 A | 9/1994 | Middendorf et al. | 204/299 R |
| 5,360,523 A | 11/1994 | Middendorf et al. | 204/182.8 |
| 5,986,264 A | 11/1999 | Grünewald | 250/310 |
| 6,031,614 A | 2/2000 | Michaelis et al. | 356/369 |
| 6,043,506 A | 3/2000 | Heffelfinger et al. | 250/584 |
| 6,320,196 B1 | 11/2001 | Dorsel et al. | 250/458.1 |
| 6,326,628 B1 | 12/2001 | Kimura et al. | 250/458.1 |
| 6,396,579 B1 | * 5/2002 | Hayamizu et al. | 356/239.7 |

FOREIGN PATENT DOCUMENTS

| | | |
|---|---|---|
| JP | 62273404 | 11/1987 |
| JP | 62273405 | 11/1987 |
| JP | 63168523 | 7/1988 |

OTHER PUBLICATIONS

Life Science—Confocal Scanning and Artifact Rejection for Microarrays, http://www.gsilumonics.com/lifescience%5Fframe/tech1.htm, 3 pages (Jul. 31, 2000).

Life Science—Microarray Analysis Systems http://www.g-silumonics.com/products%5Fframe/datashts/scanarray/specs.htm 5 pages (Jul. 31, 2000).

Middendorf et al., "Two–dimensional infrared fluorescence scanner used for DNA analysis," Proc. SPIE vol. 2388, p. 44–55, Advances in Fluorescence Sensing Technology II, Joseph R. Lakowicz; Ed., Publication Date: May 1995.

* cited by examiner

Primary Examiner—Stephone Allen
Assistant Examiner—Christopher W. Glass
(74) Attorney, Agent, or Firm—Brinks Hofer Gilson & Lione

(57) ABSTRACT

The preferred embodiments described herein provide an apparatus and method for intersecting a light beam and a focal point of a detector at an object of interest. In one preferred embodiment, an apparatus is provided comprising a first support element and a first member carrying a light source and a detector. The first member is pivotable between first and second positions, and when the first member is in the first position, a light beam generated by the light source and a focal point of the detector intersect at an object of interest carried by the first support element. When the first member is in the second position, the light beam and the focal point of the detector intersect at an object of interest carried by a second support element disposed on the first support element.

28 Claims, 7 Drawing Sheets

APPARATUS AND METHOD FOR ANALYZING AN OBJECT OF INTEREST HAVING A PIVOTABLY MOVABLE SOURCE AND DETECTOR

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of government contract AI41895 awarded by the NIH.

BACKGROUND

In many applications, a light source and a detector are used to analyze an object of interest. With reference to FIG. 1, a housing 103 carries a light source 105 and a detector 120 and is positioned adjacent a first support element 115 (such as a glass plate). The light source 105 generates a light beam that strikes a portion of an object 110 carried by the first support element 115, and the detector 120 is positioned so that its focal point intersects the light beam at the object 110. As described in U.S. Pat. No. 5,360,523, such an analyzer can be used in DNA sequencing applications. In such an application, a plurality of DNA channels in a gel electrophoresis slab sandwiched between two glass plates are scanned with a laser that excites fluorescent markers attached to DNA strands, and a sensor is focused on the area of the gel slab excited by the laser.

When the thickness of the first support element 115 varies or when a second support element 125 (such as a cover slip or tray, see FIG. 2) is interposed between the object 110 and the first support element 115, the focal point of the detector may no longer be on the object 110. To maintain the focal point on the object 110, the housing 103 carrying the light source 105 and detector 120 can be linearly translated closer to the first support element 115, as shown in FIG. 2. While the focal point of the detector 120 is once again on the object 110, the focal point no longer intersects the light beam. This misalignment can result in a suboptimal analysis of the object 110 (e.g., a faded image or a magnitude response error). Accordingly, unless the object 110 is on the first support element 115, the light beam and the focal point do not coincide.

There is a need, therefore, for an apparatus and method for intersecting a light beam and a focal point of a detector at an object of interest that will overcome the disadvantages described above.

SUMMARY OF THE PRESENTLY PREFERRED EMBODIMENTS

The present invention is defined by the following claims, and nothing in this section should be taken as a limitation on those claims.

By way of introduction, the preferred embodiments described below provide an apparatus and method for intersecting a light beam and a focal point of a detector at an object of interest. In one preferred embodiment, an apparatus is provided comprising a first support element and a first member carrying a light source and a detector. The first member is pivotable between first and second positions, and when the first member is in the first position, a light beam generated by the light source and a focal point of the detector intersect at an object of interest carried by the first support element. When the first member is in the second position, the light beam and the focal point of the detector intersect at an object of interest carried by a second support element disposed on the first support element.

The preferred embodiments will now be described with reference to the attached drawings.

DETAILED DESCRIPTION OF THE PRESENTLY PREFERRED EMBODIMENTS

Figure 1:
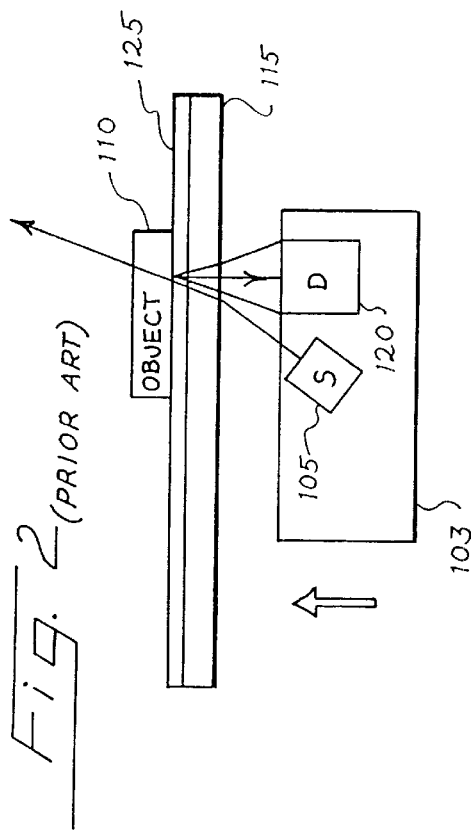
FIGS. 1 and 2 are illustrations of a prior art apparatus.
Figure 3:
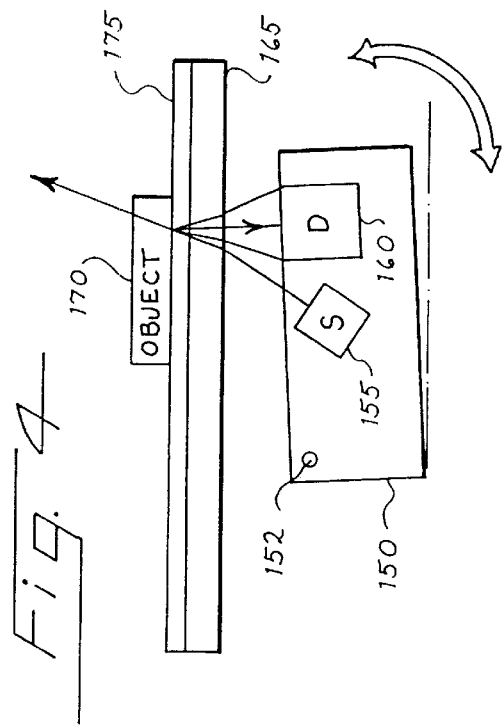
FIGS. 3 and 4 are illustrations of an apparatus of a preferred embodiment pivoted in first and second positions.
Figure 4:
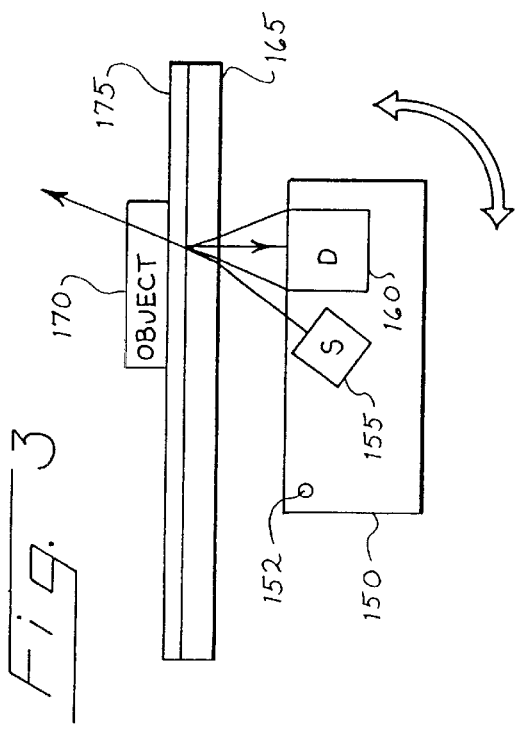

Turning now to the drawings, FIGS. 3 and 4 are illustrations of an apparatus of a preferred embodiment. It should be noted that illustrations in these and the other drawings are not necessarily proportional or drawn to scale. The apparatus comprises a first member 150 that carries a light source 155 and a detector 160 and is positioned adjacent a first support element 165. The first member 150 is pivotable about a pivot point 152 between first and second positions. When the first member 150 is in the first position, a light beam generated by the light source 155 and a focal point of the detector 160 intersect or coincide at an object of interest 170 carried by the first support element 165 (such as in FIG. 1). A "support element" can take any suitable form, including, but not limited to, a glass plate, a cover slip, a carrier material (such as water or gel), a cassette, a membrane, a bag, a disc, or a tray. An object is "carried by" the support element when the object is on the support element (such as when the object rests on top of a plastic tray) or when the object is in the support element (such as when the object is in a gel carrier member). In one application, the object of interest 170 is a DNA sample, and the light beam is a laser that excites a fluorescent marker attached to a DNA strand.

Figure 2:
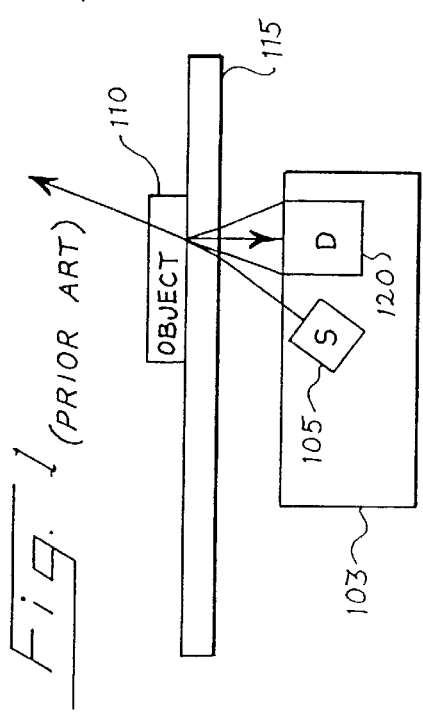

As shown in FIG. 3, when a second support element 175 is disposed on the first support element 165, the light beam and the focal point no longer intersect at the object 170. The second support element 175 can be a separate component (such as a tray placed on the first support element 165) or can be an additional thickness of material of the first support element 165 (in which case the second support element 175 is "disposed" on the first support element 165 as an integral, additional thickness). If the first member 150 were merely linearly translated closer to the object 170, the focal point of the detector 160 would be repositioned on the object 170 but would not intersect the light beam (see FIG. 2). To reposition the focal point of the detector 150 at the object 170 while maintaining light beam alignment with the focal point, the first member 150 is pivoted (e.g., by a motor) about the pivot point 152 to the second position, shown in FIG. 4. As used herein, the term "pivoting" shall mean pivoting, rotating, and/or tilting. Factors such as the refractive index of the first and second support elements 165, 175 and the angles at which the light source 155 and the detector 160 are positioned in the first member 150 can be taken into consideration in determining how much the first member 150 should be pivoted. As shown in FIG. 4, pivoting the first member 150 to the second position decreases the incident angle of the light beam, thereby preventing separation of the light beam and focal point of the detector 160. Accordingly, pivoting the first member 150 compensates for the presence of the second support element 175 and maintains the intersection of the light beam and focal point on the object 170. In an application such as DNA sequencing, this preferred embodiment ensures that the light beam and the focal point of the detector 160 coincide to excite and detect a fluorescent marker in an object 170 irrespective of whether the object 170 is carried by the first support element 165 or by the second support element 175. A user can indicate whether an additional support element is present and what type of additional support element is present, and this information can be used by a processor to determine how much the first member 150 should be pivoted. For example, if the user indicates that a plastic tray is being used to carry the object 170, the processor can provide more pivot than if a tray of a different type of material were used.

Because the light source 155 and the detector 160 are both carried by a single structure, when the first member 150 pivots, the light source 155 and the detector 160 both pivot together, and the light beam and the focal point are realigned simultaneously. Accordingly, the refocusing of the detector 160 and the collimation of the light beam are both made in a single adjustment. Further, because the light source 155 and the detector 160 are not individually adjusted in this preferred embodiment, the initial alignment of the optical axes is maintained. Accordingly, pivoting the first member 150 does not disrupt the initial alignment of the optical axes.

As noted above, this preferred embodiment maintains the intersection of the light beam and focal point on the object 170 irrespective of whether the object 170 is carried by the first support element 165 or whether a material (such as the second support element 175) is interposed between the object 170 and the first member 150. In the discussion above, it was assumed that the index of refraction of the second support element 175 was the same as the index of refraction of the first support element 165. It should be noted that if the indices of refraction of the first and second support elements 165, 176 differ, the light beam and the focal point of the detector 160 may not truly intersect when the first member 150 is pivoted to the second position. However, in this situation, the focal point of the detector 160 would be closer to the light beam than if the first member 150 were merely linearly translated closer to the first support element 165 (as in FIG. 2). Accordingly, as used herein, the light beam and the focal point of the detector 160 "intersect" when the light beam and the focal point coincide or when the light beam and the focal point are positioned closer to each other than they would have been if pure translational movement were used.

The following is a description of one presently preferred application of the embodiment described above. In this application, the apparatus is used in the analysis of fluorescent markers attached to biological material (e.g., strands of DNA). It should be noted that this application does in no way limit the scope of the invention and that the preferred embodiment described above can be used in any suitable application.

Figure 5:
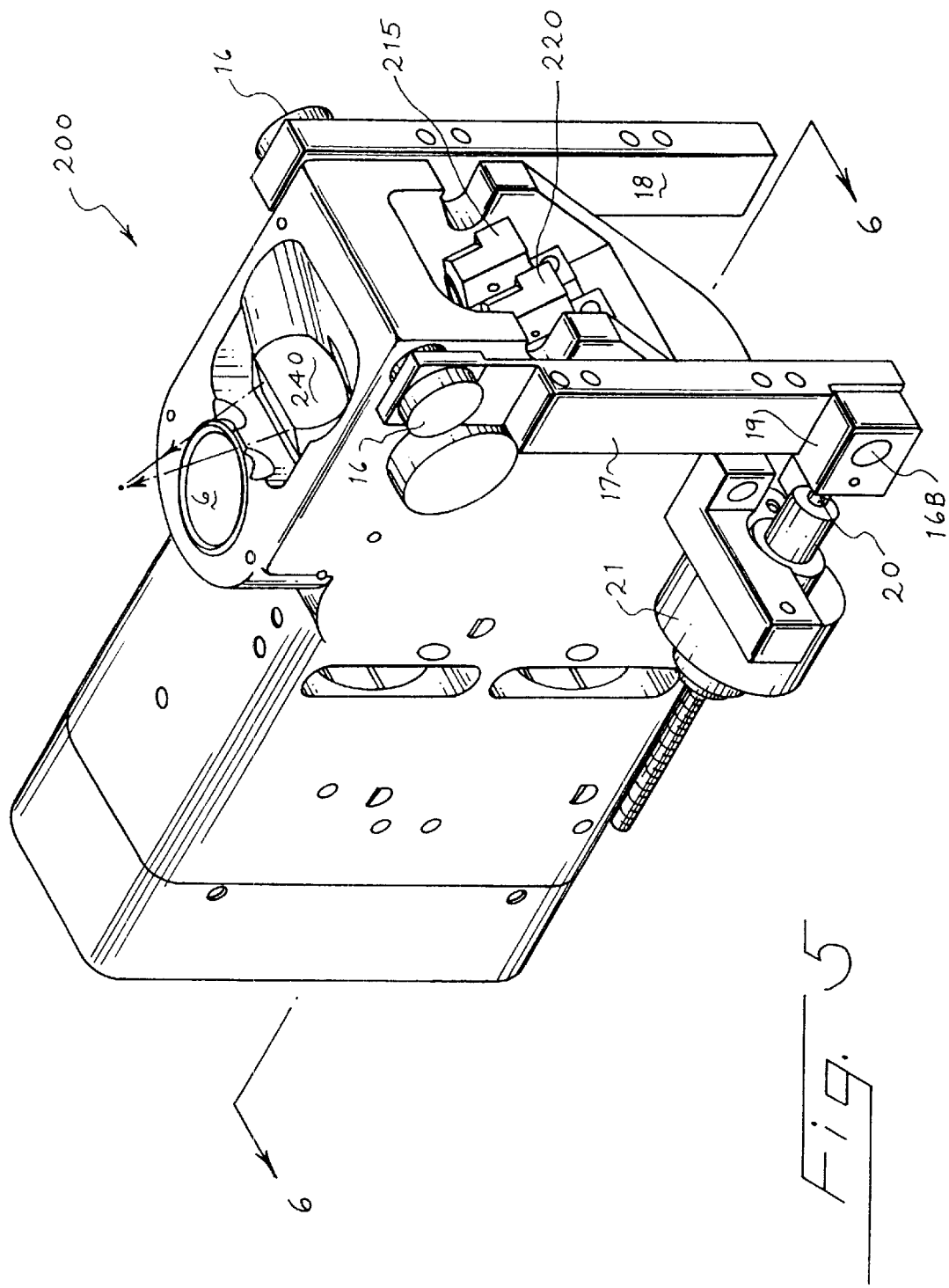
FIG. 5 is a perspective view of an apparatus of a preferred embodiment.
Figure 6:
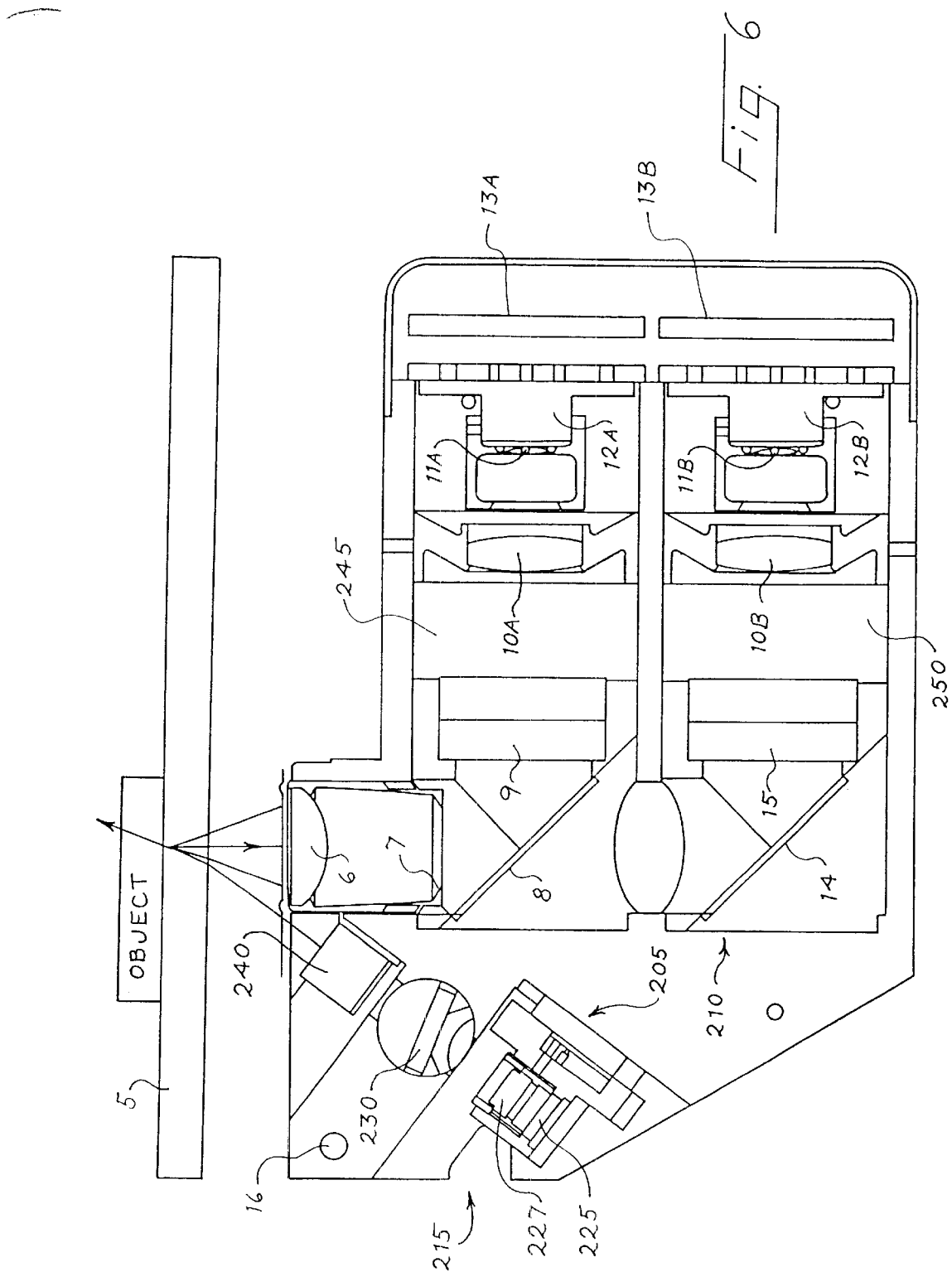
FIG. 6 is a sectional view of the apparatus taken along line 6—6 of FIG. 5.

Turning again to the drawings, FIG. 5 is a perspective view of an analyzer 200 of a presently preferred embodiment, and FIG. 6 is a sectional view of the analyzer 200 taken along line 6—6 of FIG. 5. The analyzer 200 comprises a pivot point 16, and the analyzer 200 is pivotable with respect to the pivot point 16 between first and second positions. The analyzer's housing carries a light source section 205 and a detector section 210 and is preferably made from aluminum. The light source section 205 is positioned to generate a light beam at an object carried by the first support element 5. In this preferred embodiment, the first support element 5 takes the form of a 6.5 mm Borosilicate sample support glass plate (preferably, Schott Borofloat 33). The detector section 210 is positioned such that the focal point of the detector section 210 coincides with the light beam generated by the light source section 205 at an object carried by the first support element 5. The components of the light source section 205 and the detector section 210 of a presently preferred embodiment will now be described.

The light source section 205 of this preferred embodiment comprises first and second laser assemblies 215, 220 (see FIG. 5). The first laser assembly 215 will be described in conjunction with FIG. 6. Because the first and second laser assemblies 215, 220 contain similar components, for simplicity, the individual components of the second laser assembly 220 will not be described unless they differ from those of the first laser assembly 215. As shown in FIG. 6, the first laser assembly 215 comprises a laser 225 and a laser collimator 227 (preferably with an effective focal length of 4.6 mm and a numerical aperture of 0.47). It is preferred that the laser 225 of the first laser assembly 215 be a 780 nm, 20 mW diode laser and that the laser of the second laser assembly 220 be a 680 nm, 20 mW diode laser. Positioned along the optical path of the laser beam generated by the laser 225 is a first bandpass interference filter 230, which preferably has a passband centered at 780 nm. The bandpass interference filter positioned along the optical path of the laser beam generated by the second laser preferably has a passband centered at 680 nm. An achromat lens 240 (preferably a 31 mm effective focal length, f/1.8 lens) is also positioned in the optical path. The infinite conjugate of the lens 240 is toward the laser collimator 227.

The detector section 210 comprises first and second detector assemblies 245, 250. Each detector assembly 245, 250 comprises a respective silicon avalanche photodiode 12A, 12B temperature-stabilized to 20° C. with a 0.5 mm active diameter and a corresponding 300 mega-ohm gain, 20 kHz pre-amplifier circuit board 13A, 13B. It is presently preferred that the avalanche photodiodes 12A, 12B be Perkin-Elmer CA309025 avalanche photodiodes. Each detector assembly 245, 250 also comprises an aspheric detector field lens 11A, 11B (with an effective focal length of 6.5 mm and a plano surface toward the photodiodes 12A, 12B) and an f/1.8 achromat lens 10A, 10B (with an effective focal length of 31 mm and an infinite conjugate toward the objective lens 6). (Lens 227 is the same lens as lens 10A, 10B except that the size of lens 227 has been reduced in one dimension.) The detector section 210 also comprises an objective lens 6 positioned above a telecentric stop 7. Preferably, the objective lens 6 is a 0.7 mm diameter B270 plano-aspheric elliptical lens with a 20 mm effective focal length usable to f/1.2 and has an infinite conjugate toward the photodiodes 12A, 12B. It is preferred that the pivot point 16 be 0.25 inches down from the top surface of the analyzer 200, that the second principle point of the objective lens 6 be 1.8 inches from the pivot point 16, and that the second principle point of lens 240 be 0.074 inches down from the pivot point 16 and 1.065 inches away from the pivot point 16. It is further preferred that lens 240 be at a 37° angle. A dichroic beamsplitter 8 is positioned under the objective lens 6 and is oriented at a 45° incidence. The dichroic beamsplitter 8 transmits light above 810 nm and reflects light below 750 nm. The reflected light passes through a 720 nm passband interference filter 9 and hits the first photodiode 12A. The transmitted light is reflected by a first surface mirror 14 at a 45° incident and passes through a 822 nm passband interference filter 15 before hitting the second photodiode 12B.

In FIG. 6, the analyzer 200 is in a first position. In this first position, the analyzer 200 is pivoted at a 0.5° angle toward the bottom surface of the first support element 5, and the objective lens 6 is located 0.50 inches away from the bottom surface of the first support element 5. As shown in FIG. 6, in this first position, laser beams generated by the light sources 215, 220 and respective focal points of the detectors 245, 250 coincide at an object on the top surface of the first support element 5. The laser beam incidence is preferably 37.5°, and the objective front focal length, including the first support element 5, is preferably 0.758 inches. In one preferred application, the object is a DNA sample with two different types of fluorescent markers attached to strands of DNA. The first and second light sources 215, 220 generate laser beams at wavelengths in the absorption spectrum of the first and second markers, respectively. The excited markers generate a fluorescence at different wavelengths, and the generated light passes through the objective lens 6 and impinges on the beamsplitter 8. The beamsplitter 8 transmits longer wavelengths of light to the mirror 14 and reflects shorter wavelength of light. The transmitted light and reflected light are directed to the photodiodes 12A, 12B through their respective interference filters 9, 15. The photodiodes 12A, 12B convert the detected light to electrical signals, which are amplified by the pre-amplifier circuit boards 13A, 13B and sent to a processor (not shown) for processing.

In the example described above, the object was placed directly on the first support element 5. If the object were instead carried on a second support element (such as a plastic tray) placed on the first support element 5, the intersection of the laser beams and the focal points of the detectors would not be at the object. For example, if the second support element were 3 mm thick, the intersection of the laser beams and focal points would be 3 mm below the object. If the assembly 200 were merely linearly translated closer to the first support element 5, the focal points of the detectors would be refocused on the object, but the laser beams would no longer intersect the focal points because of the refraction effects of the first and second support elements (see FIG. 2). For example, if the analyzer 200 were linearly translated about 2 mm closer to the first support element 5, the laser beams would strike the first support element 5 farther from the objective lens axis and, due to the higher refraction, would miss the focal points of the detectors. In this situation, the focal points of the detectors would no longer coincide with the area of the object excited by the laser beams. For example, when the objective front focal length (including the first and second support elements) is about 0.8017 inches and when the analyzer 200 linearly translates 0.076 inches to refocus on the top surface of the first and second support elements, the laser beams miss the focal points by about 0.005 inches.

Figure 7:
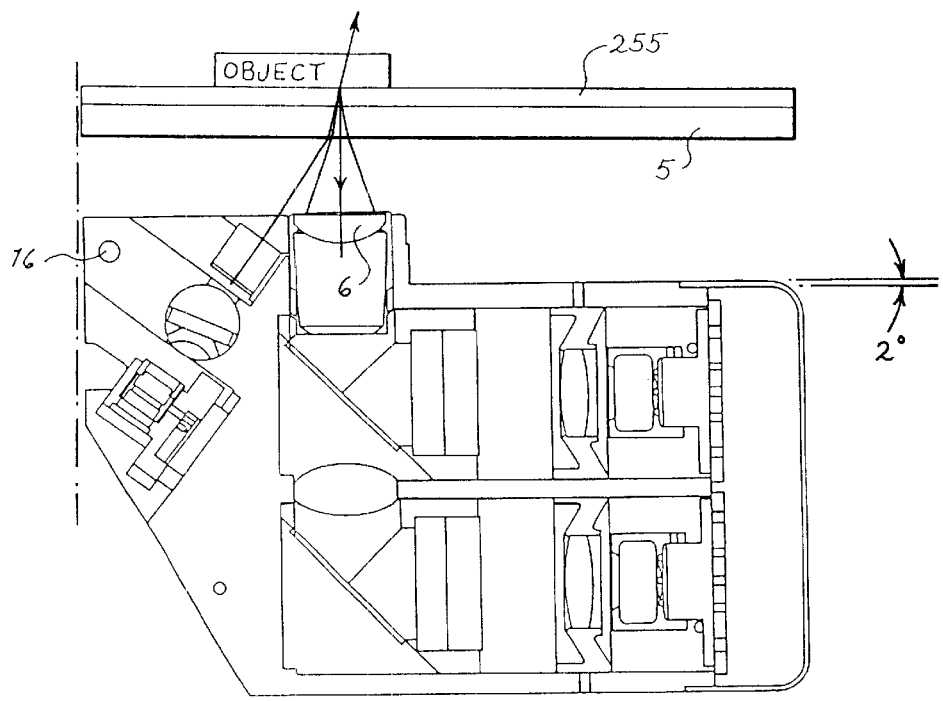
FIG. 7 is a view of the apparatus of FIG. 5 pivoted to a second position.

To preserve laser beam coincidence with the focal point of the detector, the analyzer 200 is pivoted to a second position, as shown in FIG. 7. In this preferred embodiment, the analyzer 200 is pivoted an additional 2.0° toward the bottom surface of the first support element 5 (for a total pivot of 2.5°). In this way, the laser incidence is now 35°, and the front focal length of the objective lens 6 (including the first and second support elements 5, 255) is 0.801 inches. With this rotation, the objective lens 6 has moved toward the desired focal point, and the angle at which the laser enters the first support element 5 has decreased, thereby decreasing refractive change and preserving the coincidence of the laser beam and the focal point. Smaller or greater amounts of rotation can be made if the second support element 255 is thinner or thicker than 3 mm.

Figure 12:
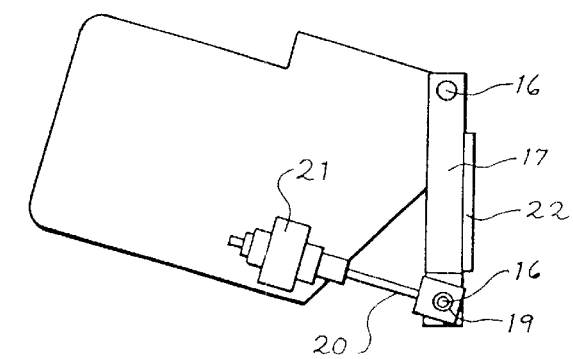
FIGS. 12 and 13 are illustrations of an apparatus of a preferred embodiment pivoted in first and second positions.
Figure 13:
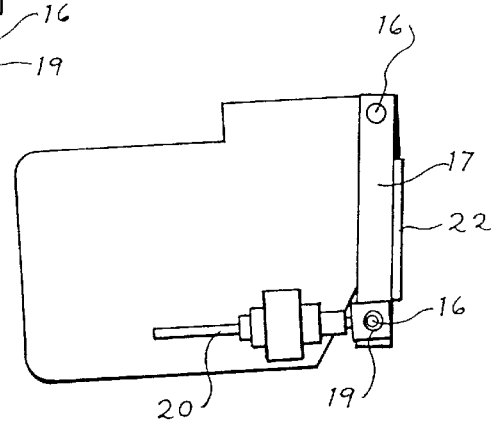
Figure 8:
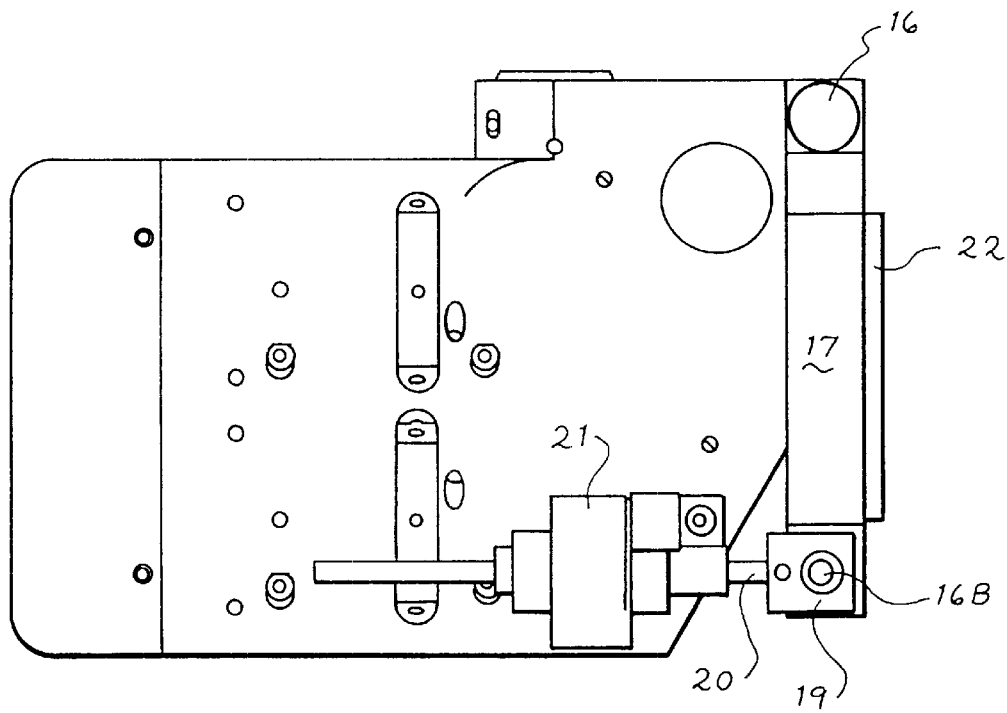
FIG. 8 is a right-side view of the apparatus of FIG. 5.
Figure 9:
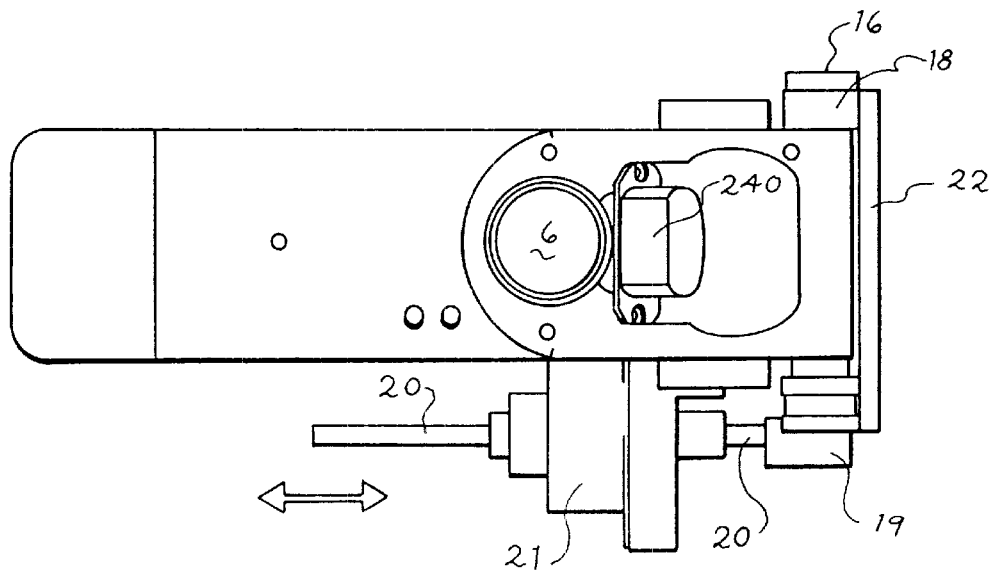
FIG. 9 is a top view of the apparatus of FIG. 5.
Figure 10:
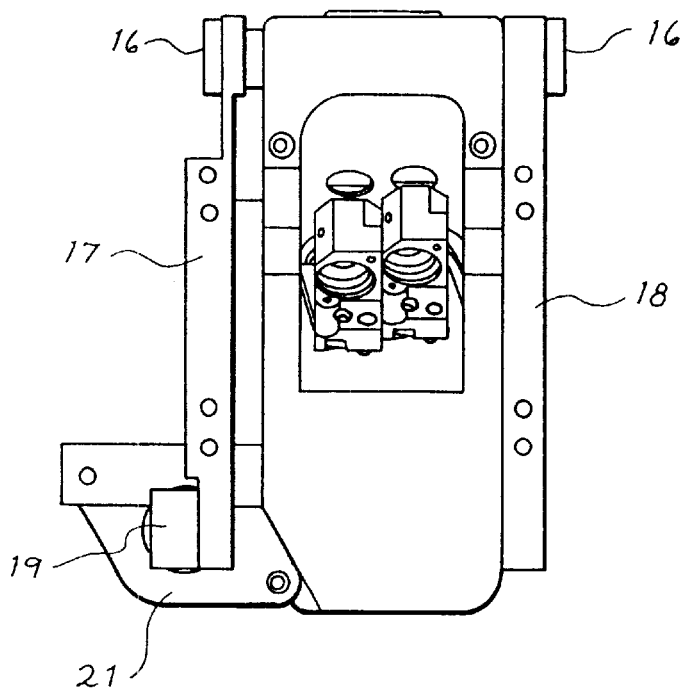
FIG. 10 is a rear view of the apparatus of FIG. 5.
Figure 11:
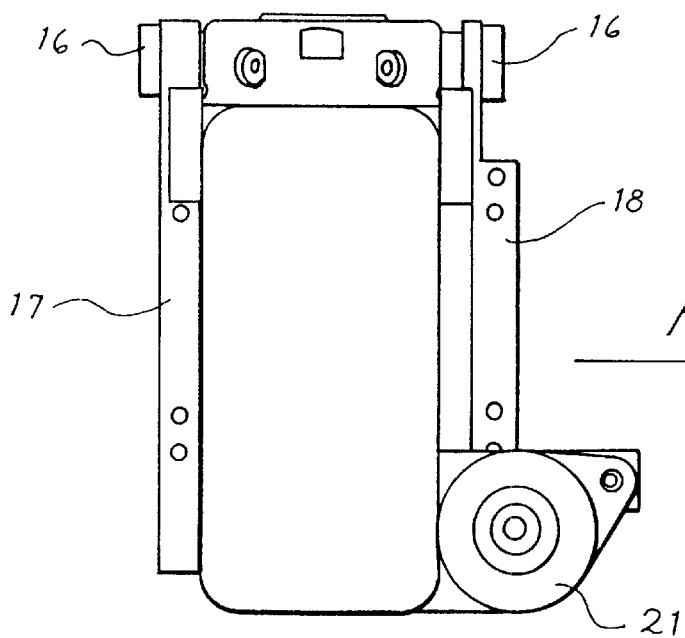
FIG. 11 is a front view of the apparatus of FIG. 5.

The pivoting operation will now be described with reference to FIGS. 5 and 8–13. FIGS. 8–11 are right-side, top, rear, and front views, respectively, of the analyzer 200. As shown in FIG. 5, pivot point 16 is located on first and second mounting arms 17, 18. The pivot point 16 can be, for example, a leaf spring or a tight rotary bearing. The first and second mounting arms 17, 18 are mounted to a fixed mounting plate 22 (see FIG. 8), which will be described in more detail below. The first mounting arm 17 contains a motor pushrod bearing block 19 that pivots on the first mounting arm 17 about a second pivot point 16B. A motor pushrod 20 couples with the motor pushrod bearing block 19 and with a motor 21. In operation, the motor 21, which is preferably a linear stepper motor, extends or retracts the motor pushrod 20 to affect tilt about the pivot point 16 at top of the analyzer 200. In FIG. 10, the mounting plate 22 has been removed to show the first and second laser assemblies 215, 200. FIGS. 12 and 13 are illustrations of the analyzer 200 in exaggerated highest (with motor pushrod 20 fully extended) and lowest (with motor pushrod 20 fully retracted) positions.

Figure 14:
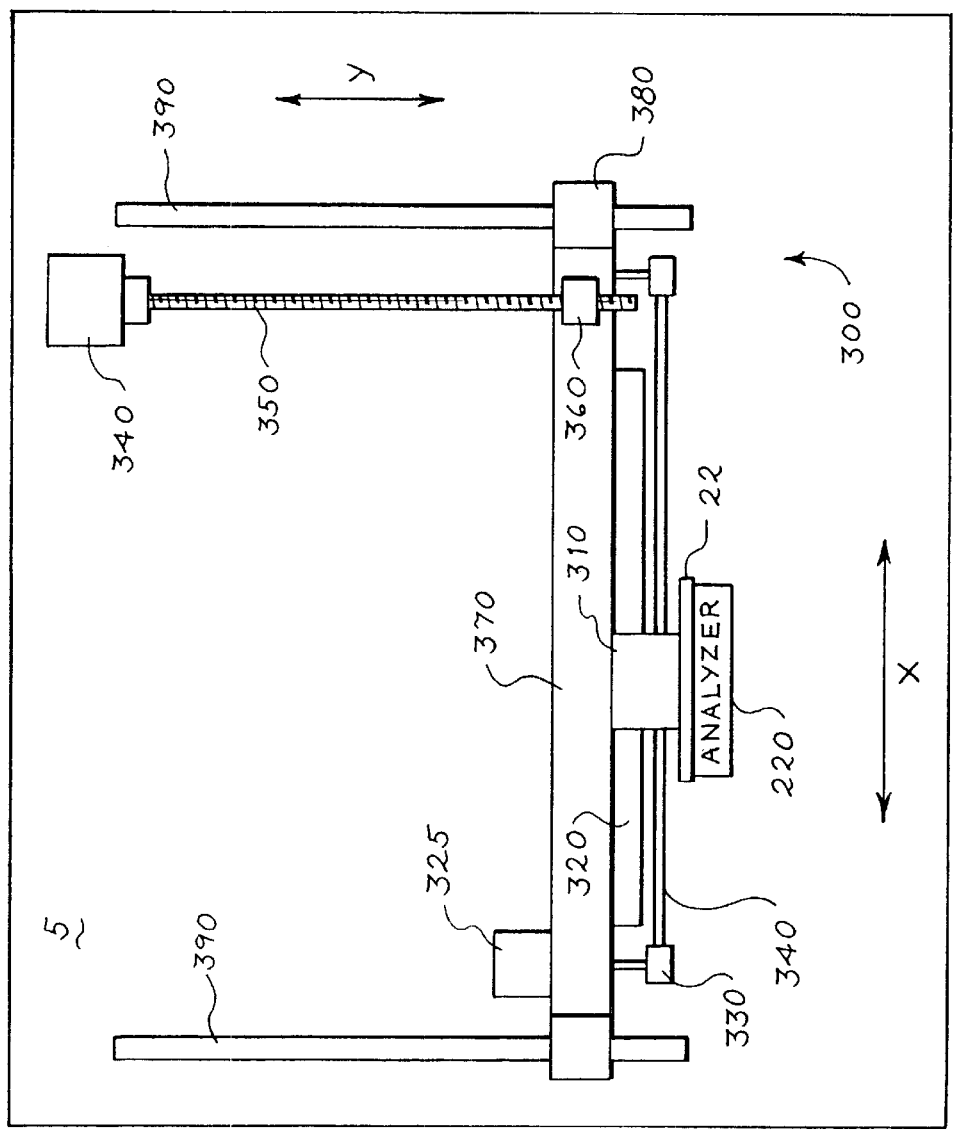
FIG. 14 is an illustration of a scanning mechanism of a preferred embodiment.

As described above, the first and second mounting arms 17, 18 are mounted to a mounting plate 22. In this preferred embodiment, the mounting plate 22 is rigidly coupled with the first and second mounting arms 17, 18. As used herein, the term "coupled with" means directly coupled with or indirectly coupled with through one or more components. In one preferred embodiment, the mounting plate 22 is part of the scanning mechanism 300 disposed under the first support element 5, as shown in FIG. 14. The mounting plate 22 is coupled with a moving block 310 that slides along a linear slide rail 320. In operation, a motor 325 rotates a pulley 330 that moves a toothed belt 340 engaged with the moving block 310 to move the mounting plate 22 (and the analyzer 200) in an x direction along the linear slide rail 320. A second motor 340 turns a leadscrew 350 threaded through a leadscrew nut 360 in a frame 370. Rotation of the leadscrew 350 causes a slide block 380 on the frame 370 to move along a linear slide 390 to move the mounting plate 22 (and the analyzer 200) in the y direction. In this way, the analyzer 200 can scan an object in one or two dimensions. As illustrated by this drawings, the pivoting of the analyzer 200 is independent of any pivoting of the members on which the analyzer moves along in either the x or the y direction and has no relation to x or y movement. Accordingly, the pivot point 16 maintains a constant distance in the Z direction from the first support surface 5. In another preferred embodiment, the member along which the analyzer 100 moves in either or both the x or y directions also pivots.

As noted above, the preferred embodiments described herein can be used in any suitable application, specifically those applications in which it is desired to intersect a light beam with a focal point of a detector. For example, the analyzer can be used in non-scanning, one-dimensional scanning, or two-dimensional scanning applications, such as fluorescence microscopy of electrophoresis gels. In the presently preferred embodiment described above, the analyzer was a part of a DNA sequencing apparatus. U.S. Pat. No. 5,360,523, which is assigned to the assignee of the present invention and is hereby incorporated by reference, describes one type of DNA sequencing apparatus. The preferred embodiments described above can be used in applications in which the light beam is used to excite a marker and in applications in which an excitable marker is not used. Further, the preferred embodiments can be used to analyze non-biological material. For example, the apparatus described herein can be used to inspect the surface of or a region within a non-biological object. Further, while two light sources and two detectors were used in the embodiment illustrated above, it should be noted that one or more than two light sources and/or detectors can be used. Additionally, any of the various aspects of the preferred embodiments described above can be used alone or in combination.

It is intended that the foregoing detailed description be understood as an illustration of selected forms that the invention can take and not as a definition of the invention. It is only the following claims, including all equivalents, that are intended to define the scope of this invention.

What is claimed is:

1. An apparatus for intersecting a light beam and a focal point of a detector at an object of interest, the apparatus comprising:
   a first support element;
   a light source;
   a detector; and
   a first member carrying the light source and the detector, the first member being pivotable between first and second positions;
   wherein when the first member is in the first position, a light beam generated by the light source and a focal point of the detector intersect at an object of interest carried by the first support element; and
   wherein when the first member is in the second position, the light beam and the focal point of the detector intersect at an object of interest carried by a second support element disposed on the first support element.

2. The apparatus of claim 1 further comprising a motor coupled with the first member and operative to pivot the first member between the first and second positions.

3. The apparatus of claim 1, wherein the first member is movable along a second member, and wherein the first member is pivotable independent of pivoting of the second member.

4. The apparatus of claim 3, wherein the first member pivots about a pivot point, and wherein a distance between the pivot point and the first support element is constant as the first member moves along the second member.

5. The apparatus of claim 3, wherein the first member is movable along a third member substantially orthogonal to the second member, and wherein the first member is pivotable independent of pivoting of the third member.

6. The apparatus of claim 1, wherein the first support element comprises glass.

7. The apparatus of claim 1, wherein the first support element and the second support element are separate components.

8. The apparatus of claim 1, wherein the second support element is integral with the first support element.

9. The apparatus of claim 1, wherein the light source comprises a laser.

10. The apparatus of claim 1, wherein the detector comprises a photodiode.

11. The apparatus of claim 1, wherein the first member further carries an additional light source.

12. The apparatus of claim 11, wherein the first-mentioned light source transmits light having a first wavelength and wherein the additional light source transmits light having a second wavelength, wherein the second wavelength is shorter than the first wavelength.

13. The apparatus of claim 1, wherein the first member further carries an additional detector.

14. The apparatus of claim 13, wherein the first-mentioned detector detects light at a first wavelength and wherein the additional detector detects light at a second wavelength, wherein the second wavelength is shorter than the first wavelength.

15. The apparatus of claim 14 further comprising a beam splitter having a high transmission for one of the first and second wavelengths and a high reflectance of the other of the first and second wavelengths, wherein the beam splitter is positioned in an optical path of the first-mentioned detector and the additional detector.

16. The apparatus of claim 1, wherein the object of interest comprises a fluorescent marker attached to a DNA strand.

17. The apparatus of claim 1, wherein the apparatus is part of a DNA sequencer.

18. A method for intersecting a light beam and a focal point of a detector at an object of interest, the method comprising:
   (a) providing a first member carrying a light source and a detector, the first member being pivotable between first and second positions, wherein when the first member is in the first position, a light beam generated by the light source and a focal point of the detector intersect at an object of interest carried by a first support element;
   (b) providing a second support element disposed on the first support element, the second support element carrying the object of interest, wherein the light beam and the focal point of the detector do not intersect at the object of interest; and
   (c) pivoting the first member to the second position, wherein the light beam and the focal point of the detector intersect at the object of interest carried by the second support element disposed on the first support element.

19. The method of claim 18, wherein (c) comprises pivoting the first member to the second position with a motor coupled with the first member.

20. The method of claim 18 further comprising the act of moving the first member along a second member, and wherein the act of pivoting in (c) is independent of pivoting of the second member.

21. The method of claim 20, wherein the first member pivots about a pivot point, and wherein a distance between the pivot point and the first support element is constant as the first member moves along the second member.

22. The method of claim 20 further comprising the act of moving the first member along a third member substantially orthogonal to the second member, and wherein the act of pivoting in (c) is independent of pivoting of the third member.

23. A method for intersecting a light beam and a focal point of a detector at an object of interest, the method comprising:
   (a) providing a first member comprising a light source and a detector, the first member being pivotable between first and second positions, wherein a light beam generated by the light source and a focal point of the detector intersect at an object of interest when the first member is in the first position;

(b) interposing a material between the object of interest and the first member, wherein the light beam and the focal point no longer intersect at the object of interest; and (c) pivoting the first member to the second position, wherein the light beam and the focal point intersect at the object of interest.

24. The method of claim 23, wherein (b) comprises providing a second support element between the object of interest and the first member.

25. The method of claim 23, wherein (c) comprises pivoting the first member to the second position with a motor coupled with the first member.

26. The method of claim 23 further comprising the act of moving the first member along a second member, and wherein the act of pivoting in (c) is independent of pivoting of the second member.

27. The method of claim 26, wherein the first member pivots about a pivot point, and wherein a distance between the pivot point and the material interposed between the object of interest and the first member is constant as the first member moves along the second member.

28. The method of claim 26 further comprising the act of moving the first member along a third member substantially orthogonal to the second member, and wherein the act of pivoting in (c) is independent of pivoting of the third member.

* * * * *